Patented Nov. 19, 1935

2,021,478

UNITED STATES PATENT OFFICE 2,021,478

MANUFACTURE OF COPPER AMMONIUM SALTS OF DIAZO AMINO TETRAZOLE

Willi Brün, Bridgeport, Conn., assignor to Remington Arms Company, Inc., a corporation of Delaware No Drawing. Application December 14, 1932, Serial No. 647,221

16 Claims. (Cl. 260—12)

This invention relates to the production of salts of derivatives of tetrazole, and will be described with particular reference to the copper ammonium salt of diazo amino tetrazole.

In an application filed of even date herewith, now Patent No. 2,001,299, issued May 14, 1935, the present invention has disclosed a method for the production of the copper ammonium salt of diazo amino tetrazole which includes the production, in an intermediate reaction, of the copper salt. Said copper salt is secured by dropping an excess of a suitable cupric salt such as cupric acetate into a solution of a soluble salt such as the tertiary sodium salt of diazo amino tetrazole. Said copper salt is precipitated in extremely fine amorphous particles. The addition, drop by drop, of a measured excess of ammonia to the suspension of the copper salt in the fluid from which it is precipitated results in a precipitate of square or rhombic dark green crystals of the copper ammonium salt. The process, however, requires careful control in order to avoid the formation of an undesirable impurity, not identified, which appears in the form of light colored needle crystals.

The present invention comprises the discovery of additional methods for the production of the copper ammonium salt of diazo amino tetrazole, and likewise the discovery of a slightly different crystalline form of this substance. The reacting and reaction controlling materials are a solution of a soluble salt such as the tertiary sodium salt of diazo amino tetrazole, a non-mineral acid such as glacial acetic acid, ammonia, and a cupric salt such as cupric acetate or cupric sulphate. As in the method disclosed in said patent, a solution of the tertiary sodium salt of diazo amino tetrazole may be secured from the insoluble primary sodium salt by the addition of a suitable amount of sodium hydroxide. Thus, the materials actually used and their proportions may be 1.2 grams of the primary sodium salt of diazo amino tetrazole and 10 c. c. of normal sodium hydroxide in 100 c. c. of water, 5 grams of a cupric salt such as cupric acetate or cupric sulphate in 50 c. c. of water, 1 c. c. of glacial acetic acid, and 35 to 50 c. c. of concentrated ammonia. It will be noted that these proportions comprise an excess of both the cupric salt and the ammonia.

The invention comprises not less than three different methods of bringing these materials together, each method resulting in a characteristic precipitate of the substantially pure copper ammonium salt. These three methods are as follows:

*Method A.*—To the solution of a sodium salt of diazo amino tetrazole, the acetic acid and the ammonia are added; thereby bringing together materials the reaction of which should result in the formation of the ammonium salt of diazo amino tetrazole. However, the mixing of these materials does not result in a precipitate. If the ammonium salt is formed, it remains in solution. The cupric salt is now added, preferably drop by drop, with the formation of a precipitate of crystals of the copper ammonium salt of diazo amino tetrazole, which crystals are of unique configuration. Their faces join in the angle which is characteristic of crystals of this substance made in other ways, but the crystals are elongated on two axes and shortened on the third axis, so that they appear as plates rather than as approximate rhombs. For convenience, this form of crystals will be identified as "plate crystals", and the second form of crystals (not produced in the method now under discussion) will be identified as "rhombic crystals". The plate crystals of the present method have essentially the same color as the rhombic crystals, although their color appears to be somewhat lighter due to their lesser thickness.

*Method B.*—The cupric salt solution, ammonia and acetic acid, are first brought together, with the formation (in solution) of a well-known cupric ammonium acetate, immediately identified by its characteristic deep blue color. Into this solution is dropped, preferably drop by drop, the solution of a soluble salt of diazo amino tetrazole; and the copper ammonium salt of diazo amino tetrazole is precipitated as a mixture of the plate crystals produced by Method A of this application and the previously known rhombic crystals. Both forms of crystals appear to be the substantially pure copper ammonium salt.

*Method C.*—This method is the reverse of Method B, that is, the mixture of cupric salt solution, ammonia, and acetic acid, is dropped, preferably drop by drop, into the solution of a soluble salt of diazo amino tetrazole. The resulting precipitate, like that secured under Method A, is all in the form of the plate crystals.

The crystals secured under any of the foregoing methods may be left for several hours in the liquids from which they are precipitated, without the formation of any such impurity as characterizes the product resulting from the practice of previously known methods; and, further, this impurity has not been encountered in any intermediate step or any variation of any of the three methods herein described.

It appears to be of importance that the acetic acid be associated with the ammonia, and not with the cupric salt. This, if under Method A, above outlined, the acetic acid is added to the cupric salt solution, and this mixture is added to the solution of the sodium salt and ammonia, there results a long and rather heavy blue crystal of an unidentified substance which is ignited or exploded only with considerable difficulty.

Both forms of crystals produced in accordance with the present disclosure, and mixtures of them, are explosive in character, and have been shown to satisfy all the requirements of ammunition priming sensitizing materials.

A variation in the process which is within the purview of the invention comprises the use of ammonium acetate in place of ammonia and acetic acid, the procedure remaining essentially the same. This variation is applicable to Methods A, B and C, above outlined.

Since the present invention comprises the first discovery of a method of securing the copper ammonium salt of diazo amino tetrazole without first precipitating the copper salt, the appended claims are to be broadly construed.

What is claimed is:

1. In the manufacture of the copper ammonium salt of diazo amino tetrazole, the method which comprises the admixture of a solution of the sodium salt of diazo amino tetrazole with a cupric salt and with ammonia in the presence of acetic acid, the reacting materials being brought together in such sequence that no intermediate reaction results in a precipitate.

2. In the manufacture of the copper ammonium salt of diazo amino tetrazole, the method which comprises the admixture of a solution of the sodium salt of diazo amino tetrazole with a cupric salt and with ammonia in the presence of acetic acid, the reacting materials being brought together in such sequence that no intermediate reaction results in a precipitate of a copper salt of diazo amino tetrazole.

3. In the manufacture of the copper ammonium salt of diazo amino tetrazole by the reaction of a solution of a cupric salt, ammonia and acetic acid, upon a solution of a soluble salt of diazo amino tetrazole, the method which comprises the admixture of the ammonia and acetic acid with the diazo amino tetrazole salt solution not later than the admixture of the cupric salt solution with the diazo amino tetrazole salt solution, whereby the precipitation of a copper salt of diazo amino tetrazole is prevented.

4. In the manufacture of the copper ammonium salt of diazo amino tetrazole by the reaction of a solution of a cupric salt, ammonia and acetic acid, upon a solution of a soluble salt of diazo amino tetrazole, the method which comprises the admixture of the ammonia and acetic acid with the diazo amino tetrazole salt solution prior to the admixture of the cupric salt solution with the diazo amino tetrazole salt solution.

5. In the manufacture of the copper ammonium salt of diazo amino tetrazole, the method which comprises the preparation of a solution of a soluble salt of diazo amino tetrazole, the addition thereto of ammonia and acetic acid, and the subsequent addition of a solution of a cupric salt.

6. In the manufacture of the copper ammonium salt of diazo amino tetrazole, by the reaction of a solution of a cupric salt, ammonia and acetic acid, upon a solution of a soluble salt of diazo amino tetrazole, the method which comprises the admixture of the cupric salt solution with the ammonia and acetic acid to form solution "A", and the admixture solution "A" with the solution of a soluble diazo amino tetrazole salt.

7. In the manufacture of the copper ammonium salt of diazo amino tetrazole by the reaction of a solution of a cupric salt, ammonia and acetic acid, upon a solution of a soluble salt of diazo amino tetrazole, the method which comprises the admixture of the cupric salt solution with the ammonia and acetic acid to form solution "A", and the addition of solution "A" to the solution of a soluble diazo amino tetrazole salt.

8. In the manufacture of the copper ammonium salt of diazo amino tetrazole by the reaction of a solution of a cupric salt, ammonia and acetic acid, upon a solution of a soluble salt of diazo amino tetrazole, the method which comprises the admixture of the cupric salt solution with the ammonia and acetic acid to form solution "A", and the addition of a solution of a soluble diazo amino tetrazole salt to solution "A".

9. In the manufacture of the copper ammonium salt of diazo amino tetrazole, the method which comprises the preparation of a solution of a soluble salt of diazo amino tetrazole, the admixture of a solution of a cupric salt with ammonia and acetic acid to form solution "A", and the admixture of solution "A" and the diazo amino tetrazole salt solution.

10. In the manufacture of the copper ammonium salt of diazo amino tetrazole, the method which comprises the preparation of a solution of a soluble salt of diazo amino tetrazole, the admixture of a solution of a cupric salt with ammonia and acetic acid to form solution "A", and the addition, drop by drop, of solution "A" to the diazo amino tetrazole salt solution.

11. In the manufacture of the copper ammonium salt of diazo amino tetrazole, the method which comprises the preparation of a solution of a soluble salt of diazo amino tetrazole, the admixture of a solution of a cupric salt with ammonia and acetic acid to form solution "A", and the addition, drop by drop, of the diazo amino tetrazole salt solution to solution "A".

12. In the manufacture of the copper ammonium salt of diazo amino tetrazole, the method which comprises the admixture of a solution of the sodium salt of diazo amino tetrazole with a cupric salt and with ammonium acetate, the reacting materials being brought together in such sequence that no intermediate reaction results in a precipitate.

13. In the manufacture of the copper ammonium salt of diazo amino tetrazole by the reaction of a solution of a cupric salt and ammonium acetate upon a solution of a soluble salt of diazo amino tetrazole, the method which comprises the admixture of the ammonium acetate with the diazo amino tetrazole salt solution not later than the admixture of the cupric salt solution with the diazo amino tetrazole salt solution, whereby the precipitation of a copper salt of diazo amino tetrazole is prevented.

14. In the manufacture of a copper ammonium salt of diazo amino tetrazole by the reaction between a soluble salt of diazo amino tetrazole, a cupric salt, and an ingredient selected from the group consisting of ammonia with acetic acid and ammonium acetate; the method which comprises the admixture of said diazo amino tetrazole salt with said ingredient not later than the admixture of said diazo amino tetrazole salt with said cupric salt.

15. In the manufacture of a copper ammonium salt of diazo amino tetrazole by the reaction between a soluble salt of diazo amino tetrazole, a cupric salt, and an ingredient selected from the group consisting of ammonia with acetic acid and ammonium acetate; the method which comprises the admixture of said diazo amino tetrazole salt with said ingredient and the subsequent addition of said cupric salt.

16. In the manufacture of a copper ammonium salt of diazo amino tetrazole by the reaction between a soluble salt of diazo amino tetrazole, a cupric salt, and an ingredient selected from the group consisting of ammonia with acetic acid and ammonium acetate; the method which comprises the admixture of said ingredient with said cupric salt and the admixture of the resulting composition with said diazo amino tetrazole salt.

WILLI BRÜN.

CERTIFICATE OF CORRECTION.

Patent No. 2,021,478.                                November 19, 1935.

WILLI BRÜN.

It is hereby certified that error appears in the printed specification of the above numbered patent requiring correction as follows: Page 1, first column, line 7, for "invention" read inventor; and page 2, second column, line 7, claim 6, after "admixture" insert of; and that the said Letters Patent should be read with these corrections therein that the same may conform to the record of the case in the Patent Office.

Signed and sealed this 7th day of January, A. D. 1936.

Leslie Frazer (Seal)                                         Acting Commissioner of Patents.